United States Patent [19]

Hendry et al.

[11] 4,390,486
[45] Jun. 28, 1983

[54] METHOD AND APPARATUS FOR HEATING A MOLD CAVITY UNIFORMLY

[75] Inventors: James W. Hendry, Englewood, Tenn.; Je-Chin Han, College Station, Tex.

[73] Assignee: Ex-Cell-O Corporation, Troy, Mich.

[21] Appl. No.: 245,563

[22] Filed: Mar. 19, 1981

[51] Int. Cl.³ .................. B29D 27/00; B29F 1/00
[52] U.S. Cl. ..................... 264/45.5; 264/378.16; 264/DIG. 14; 264/DIG. 83; 425/144; 425/547; 425/812; 425/817 R
[58] Field of Search ............. 264/51, 54, DIG. 83, 264/45.5, 328.16, DIG. 14; 425/547, 812, 144, 817 R

[56] References Cited

U.S. PATENT DOCUMENTS

| | | | |
|---|---|---|---|
| 4,133,858 | 1/1979 | Hayakawa et al. | 264/DIG. 83 |
| 4,164,523 | 8/1979 | Hanning | 264/DIG. 83 |
| 4,201,742 | 5/1980 | Hendry | 264/45.5 |

FOREIGN PATENT DOCUMENTS 53-39356 4/1978 Japan .................. 264/328.16

*Primary Examiner*—Philip E. Anderson
*Attorney, Agent, or Firm*—Edward J. Timmer; John C. Evans; Frank D. Risko

[57] ABSTRACT

This apparatus is used to improve the heat distribution on the cavity surface in foam molding dies where a smooth finish on the resin filled foam molded plastic product manufactured by an injection molding process is desired. This invention improves the method for heating the mold cavity using a condensing vapor in a molding die by a channel and slit type orifice means in the mold around a portion of the periphery of the part to be molded. Another channel and slit type orifice means around the remaining periphery is included in the die for removing the condensing vapor or condensate from the mold cavity. During the heating process when condensing vapor is introduced into the mold the sprue opening to the extruder is sealed by a valve means to prevent condensate from collecting therein.

10 Claims, 8 Drawing Figures

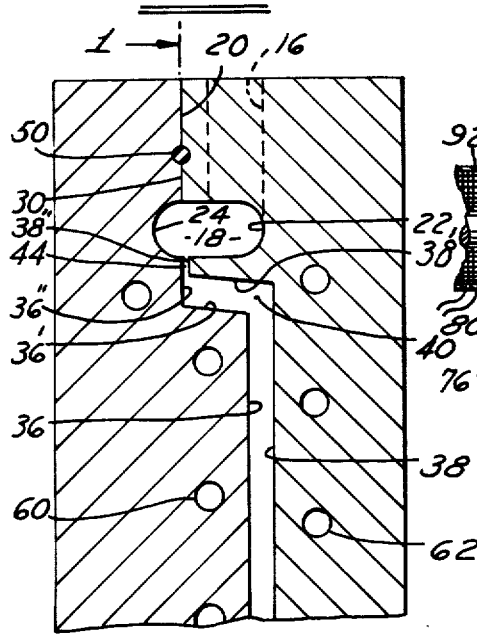
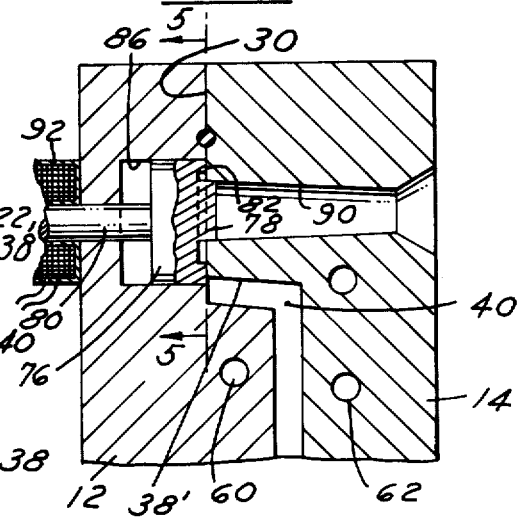
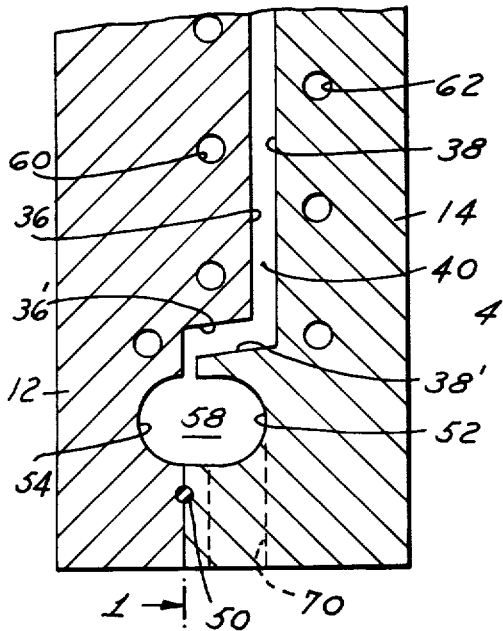
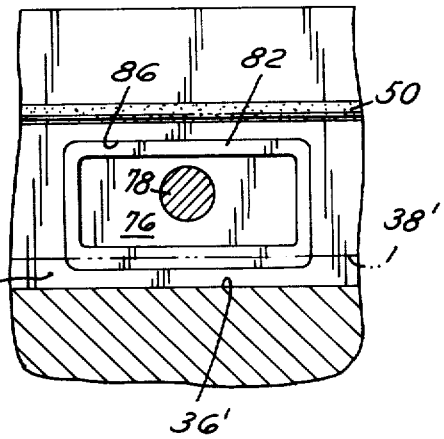

METHOD AND APPARATUS FOR HEATING A MOLD CAVITY UNIFORMLY

BACKGROUND OF INVENTION

1. Field of Invention

This invention relates to the art of injection molding a foamable resin product and, more particularly, to the process and apparatus for heating the cavity of the mold uniformly in order to achieve a smooth surface finish on the part to be produced. In the manufacturing of molded plastic parts, many applications require that the finished part have a glossy surface finish when the part comes out of the mold. In a previous patent issued to the co-inventor, Hendry, U.S. Pat. No. 4,201,742, a method and apparatus for achieving such a finish was presented. This apparatus used a valve means for injecting condensable vapor into the mold cavity in an effort to heat the skin or surface of the cavity above the deformation temperature of the particular resin that was being injected into the mold. Problems of non-uniform heating and leakage through the valve openings caused problems which sometimes gave a non-uniform albeit a smooth finish. The problem was that the internal mold cavity was not being uniformly heated and condensate was collecting in the sprue opening.

An object of this invention is to uniformly heat the working surface of the mold cavity using a condensing vapor injected directly inside the mold but having a slit type orifice for distributing the condensable vapor from a channel or manifold around the periphery of the mold cavity. Another object of the invention is to have a second channel means with a second slit orifice for venting the condensate and excess condensable vapor from the mold just prior to the injection cycle. An object of the invention is to reduce the cycle time of the process.

Another object of the invention is to use a valve means located in one of the mold halves to seal the sprue opening during the condensate cycle of the process and upon operating that valve use that same opening as a sprue gate for injecting the plasticized resin into the mold cavity. It is a further object of this invention to use chilled water for cooling the mold during the cooling cycle. It is further the object of this invention to use steam traps on all of the condensate lines. It is an object of this invention to use condensing vapor for heating the mold surface to a temperature that exceeds the heat distortion point of the material being molded. It is an object of this invention to size the slit orifices so it will pass condensable vapor and condensate but prevent the plasticized resin from expanding into the orifices.

SUMMARY OF THE INVENTION

The method and apparatus of this invention causes the mold cavity surface to be heated uniformly so that a shiny surface finish on foam molded plastic parts can be attained. This is accomplished by a unique manifold and slit orifice means for distributing the condensable vapor uniformly into the mold cavity and a similar albeit larger manifold and slit opening to remove the condensate from inside the mold cavity prior to the injection step. A further valve means is incorporated in the mold to block off or prevent condensable vapor from accumulating in the sprue opening. This same valve after it is operated, opens the sprue and then forms the passage in conjunction with the sprue gate for injection of plasticized resin into the mold cavity. By proper sequencing of the various valves, and maintaining the proper condensable vapor temperature and pressure, the entire cavity surface upon the injection step will be dry and have a uniform temperature distribution. This will improve the overall surface appearance of the molded part and improve the overall cycle time. Conventional cooling by chilled fluid passing internally through the mold completes the cycle.

DESCRIPTION OF THE DRAWINGS

FIG. 3 is a cross-section of the mold halves taken along line 3—3 in FIG. 1.

FIG. 4 is a cross-section of the sprue valving taken along line 4—4 in FIG. 1.

FIG. 5 is a view of the sprue valve sealing surface taken along line 5—5 in FIG. 4.

DESCRIPTION OF THE PREFERRED EMBODIMENTS

Figure 1:
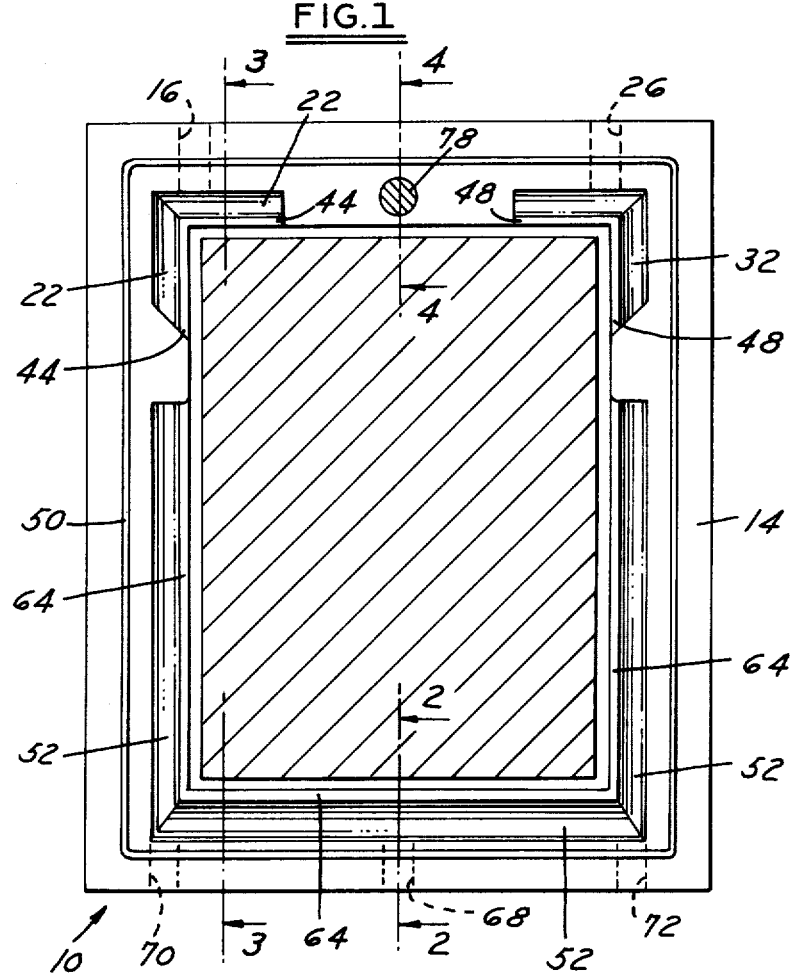
FIG. 1 is a view of the mold taken across the parting line of the mold and showing the manifold channels in the lower mold section.
Figure 2:
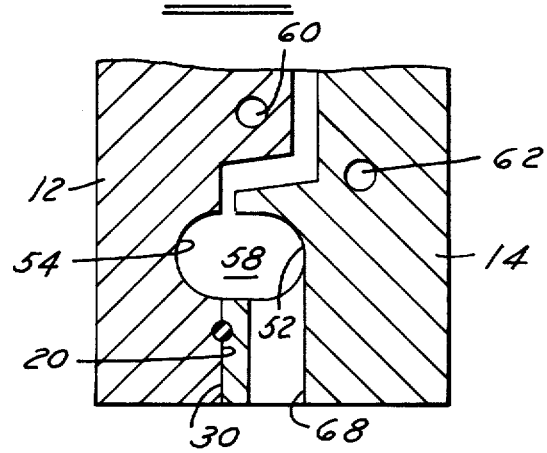
FIG. 2 is a cross-section of the outlet manifold channel and outlet of the mold taken along line 2—2 in FIG. 1.

The lower mold half or section is shown in FIG. 1 and for convenience of the description mold section 12 shown in FIG. 2 will be considered the upper mold section and mold section 14 will be called the lower mold section. FIG. 1 is taken along the parting line of the mold. Inlet means 16 and 26 in FIG. 1 intersect with manifold or channel means 22 and 32 respectively. Channel 22 extends around the upper L.H. corner of the cavity and channel 32 around the upper R.H. corner of the cavity. It will be noted that both of these inlet channel means are opened a limited distance along their respective edges of the mold. Channel 22 in the lower section viewed in FIG. 3 will mate with manifold channel 24 similarly shaped in the upper section of the mold means 50 forming channel means 18. This correspondence can thus be seen in the upper half of FIG. 3. Also, in FIG. 3, it can be seen that surface 20 of the upper mold half 12 seals against surface 30 of the lower mold half 14 and has an O-ring seal 50 that completely surrounds the mold cavity. This seal 50 can be seen also in FIG. 1.

Figure 6A:
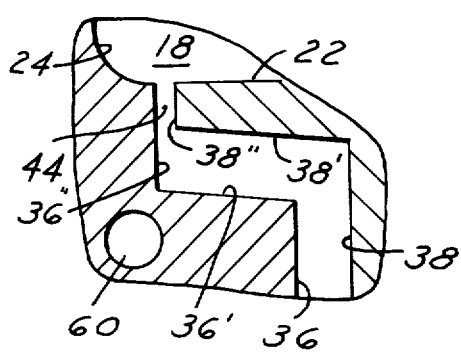
FIG. 6(a) is an enlarged cross-section of the inlet manifold and slit orifice.

The inlet channel means 18 which is formed by the surfaces of the manifold channels 22 and 24 continues around the corner of the mold cavity. A similar manifold channel means is formed on the other corner (right side) as viewed in FIG. 1. The length of these channels are predetermined depending on the size of the edge sprue and the size of the part to be molded. Referring now to FIGS. 3 and 6(a), the cavity 40 of the mold is formed by surfaces 36, 36' and 36" on the upper mold half 12 and by surfaces 38 and 38' on the lower mold half 14. A slit orifice 44 is formed between surface 36" and 38". This opening for the best utilization of the size of the particular part being molded is approximately 0.005 inches and has a depth or width of approximately 0.125 inches. Depending upon the size of the part to be molded and the material, this opening could extend to approximately 0.010 inches. In FIG. 1 this slot or slit orifice 44 extends around the upper left hand section of the mold and slit orifice 48 around the upper right hand section of the mold means. The cavity 40 of the mold shown in FIG. 3 connects to outlet manifold channel means 58 via orifice 64. Channel 52 makes up one part of the outlet manifold channel 58 and extends around three sides of the mold in the lower mold half 14 and channel 54 (best seen in FIG. 2) in the upper mold half 12 makes up the other half of channel 50. Channels 52 and 54 together form the outlet channel or manifold means 58 and are connected to outlet means 68, 70 and 72. These can be see in FIG. 1 and FIG. 2.

Figure 6B:
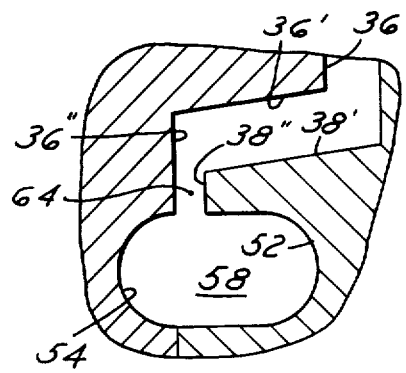
FIG. 6(b) is an enlarged section of the outlet manifold and slit orifice.

The outlet channel manifold means 58 shown in FIG. 6(b) is connected to the cavity 40 via surfaces 36" and 38" forming an outlet vapor orifice 64. This outlet vapor orifice 64 has a heighth of 0.010 inches and a width of approximately 0.125 inches. Depending on the size of the part to be molded and the material, this opening could be as large as 0.020 inches. This slot or orifice allows the condensate to exhaust from the mold cavity during the filling cycle but is still small enough to prevent plasticized foamed resin from flowing into the slit. The accumulation of condensate will flow from the surfaces to this portion of the mold. The mold shown, in order to operate properly, would be mounted in a vertical position. That is, the inlet means 16 and 26 would be located in a top most vertical direction so that the outlet openings 68, 70 and 72 would allow purging of the condensate by gravity. It is contemplated that other orientation of the mold can be accommodated by adding vacuum pumps to the outlet channel to remove the condensate. The holes or passages 60 and 62, as seen in FIG. 2 and in FIG. 3, carry cooling water through the mold halves to chill the mold after the injection step.

FIG. 4 shows the sprue valve head 76 in valve recess 86. These are both located in the upper mold section 12. Connected to the valve head 76 is armature rod 80 which is operated by solenoid 92. This solenoid can be a single acting spring return type or a double acting type being energized for one position and then being energized for the other position. The valve pilot 78 engages sprue 90 and mold half 14 on surface 30 in a sealing mode which will be discussed in the operation portion of this specification. The periphery valve surface 82 is shown engaging the lower section 30 in the area of sprue 90. It should also be noticed that this periphery valve surface 82 seals the cavity 40 which can also be seen in FIG. 5. The phantom line represents the edge of surface 38' which is one of the surface of the mold cavity.

Although not shown here in detail, this mold 10 would be mounted in a horizontal injection molding machine to the vertical platens of the machine. Connected to the mold would be the various electrical connections so that the different solenoid valves could be properly operated.

Figure 7:
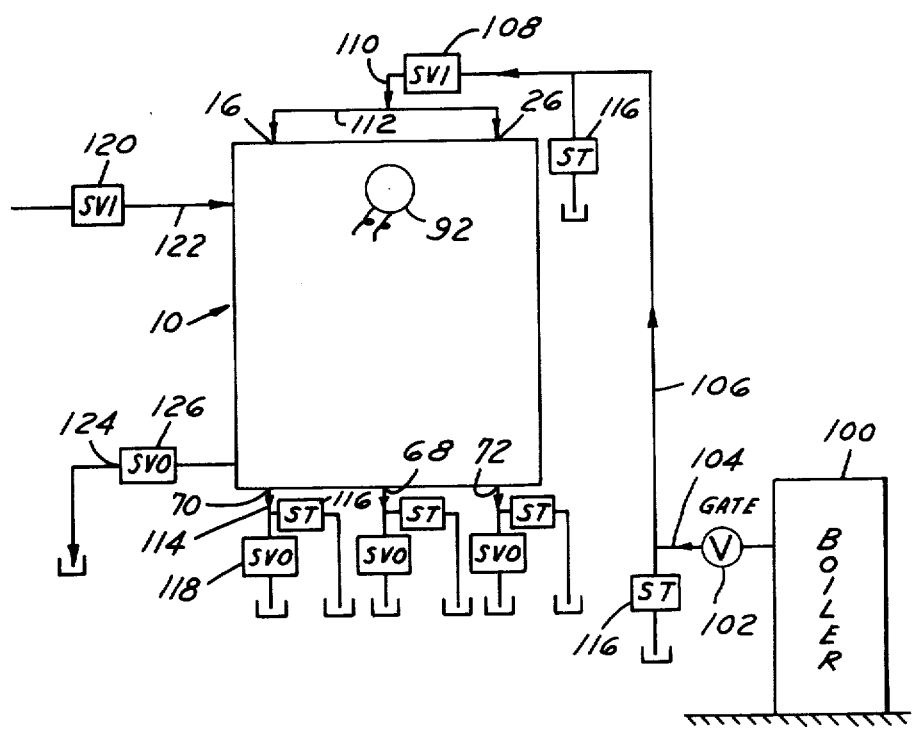
FIG. 7 is a schematic representation of the steam condensate passages and the cooling water passages.

FIG. 7 is a line schematic showing the boilers 100 and the mold means 10 and the connections to these two elements. A high pressure steam line 104 comes off boiler 100. In this line is located a gate valve 102 for controlling the flow of steam or condensable vapor from the boiler. Connected to line 104 is line 106 which carries the condensable vapor from the boiler line 104 through to the inlet solenoid valve 108. One branch off the inlet line 106 shows steam trap 116 with a return to a tank or drain. Primary inlet line 110 exiting from valve 108 is split or divided into line 112 which then connects to inlet means 16 and 26 in the mold means 10. Exiting from the outlet means 70 at the lower end of the mold means is line 114 with an outlet solenoid valve 118 in that line for connecting the vapor or condensate to a tank or drain. Coming off line 114 is steam trap 116 also going to a tank or drain. There are three outlet means 68, 70 and 72 with lines shown in FIG. 7. It is obvious that there would be additional valving as shown for each connection. Additional or fewer outlets could be required depending on the size of the part and the mold.

Entering the mold means 10 and shown on the left hand side in FIG. 7 is an inlet line 122 and a solenoid 120 which connects chilled water to the mold means 10. Line 124 shows an exit or outlet line carrying the spent water to a tank or drain connection. An outlet solenoid valve 126 is shown in line 124 for gating fluid out of the mold means 10. This outlet valve could also be a throttle type valve to control the amount of flow in the cooling cycle. Solenoid 92 is shown in FIG. 7 and this is connected to the sprue valve armature rod 80 and would be connected to an appropriate electrical control circuit as would the other electrically operated valves.

It should further be noted that ejector pins and other such usual molding hardware would be used with the mold for ejecting the part. Seals would be provided on such hardware to keep the vapor sealed within the mold cavity during the process. For convenience and simplicity of the drawings these have not been shown.

OPERATION

The operation for producing a smooth finished part will be described in conjunction with experiments conducted using a mold with this orifice design and various types of materials. The materials used were ABS, Styrene, SMC and Noryl. The Noryl was injected with a nozzle tip temperature of approximately 550° F. and an injection time of 3 to 6 seconds. The cooling temperature was 100° F. and a cure time of approximately 2½ to 3 minutes. The size of the part was approximately 3 lbs. and measured 12" wide and 16" deep and 3½" high having ¼" and ⅜" wall thicknesses. The temperature of the process can be varied depending upon the size of the part and material used and may vary from 250° F. to 420° F. at a pressure of from 50 to 300 psig.

First the mold halves 12 and 14 are closed and locked up in an appropriate machine. The experimental machine was a horizontal type capable of shooting 40 ounces of plastic @250 tons. The internal cavity 40 was sealed by the O-ring seal 50. The sprue valve head 76, as shown in FIG. 4, is operated by solenoid 92 to either open or close the sprue opening 90. At the start of a cycle, the pilot 78 will seal the sprue opening so that no condensable vapor can collect or pass into the sprue 90 during the pre-heating cycle of the mold cavity prior to the injection step. The typical cycle as herein described with specific timing relations should not be construed as the only time periods which are suitable to achieve the desired results.

The gate valve 102 and the solenoid valve 108 would be energized to allow condensable vapor to pass into the inlet means 16 and 26 for approximately 15 seconds. During this time, the outlet valves 118 would be kept closed while the steam enters the inlet manifold means 18 and passes across the slot orifice 44 on the left side in FIG. 1 and slot orifice 48 on the right side of the mold. The flow of steam or condensable vapor would be across all of the surfaces and down toward the outlet manifold means 58 passing across the outlet orifice 64. Since the mold is mounted in a vertical position, any condensing vapor in the form of water droplets will flow by gravity down into the manifold channel 58. After approximately 13 seconds, the outlet solenoid valves 118 will open. At the same time, the sprue valve solenoid 92 will also operate which will remove the pilot 78 from sprue 90. The valve head 76 would then move to the left in FIG. 4 and seat on the bottom of the recess 86. The inlet solenoid valve 108 would close at the end of 15 seconds. One second later the nozzle would be fired and the injection of plastic would begin. The plastic would flow through sprue 90 and pass into the cavity 40 across the sprue gate which would be developed between the valve head 76 and the surface 38' as best seen in FIG. 5. All of the plastic would flow through the opening bounded by the outer peripheral surface of the recess 86 and the phatom line 38' best seen in FIG. 5. For this size part, approximately 3 lbs., the nozzle firing time was about 5.5 seconds. The plastic would flow into the cavity and as it flows, the preheated surface or the skin of the mold would maintain the plastic above its deformation temperature. Approximately three to five seconds after the injection step started, the outlet solenoid valves 118 would also be closed. By this time, the fluid which would have accumulated in manifold 58 would have drained off through the solenoid valves. Upon completion of the injection step, the chilled water valves 120 and 126 would then be opened to allow water at approximately 100° F. to flow through lines 122 and into and through the cavity chill lines 60 and 62 and out through line 124. Upon completion of the chill cycle which could be from two and one-half to three minutes long depending upon the type of material and the size of the part injected, the mold would then be opened and the part removed.

Since the sprue valve had been retracted to its left most position as viewed in FIG. 4 in the valve recess 86, the sprue and the gate would be still connected to the part itself as the mold is opened to remove the part from mold means 10. This would mean that the sprue, the bisket, and the small sprue gate would be intact when the part is removed from the mold and those scrap sections would be removed at a later process step. The mold halves would then be reclosed and the solenoid valve 92 de-energized to allow the sprue valve to reclose and reseal the sprue 90. The purpose of this gate arrangement is to prevent condensable vapor during the heating process of the cavity 40 from entering up into the sprue opening 90. Most plasticized resins will react with water droplets and a blemish would occur on the exterior surface if water were allowed to mix with the extruding plastic. Therefore, special care is taken in the sealing of the sprue opening and the sealing of the cavity 40 to prevent mixing of the condensable vapor, or condensate with the plastic. Because of the high temperature of the steam which is approximately 350° at a boiler pressure of 250 psig and having the mold mounted in a vertical position, all of the condensate that would accumulate would pass through the slit orifices into the mold or manifold channels 58 and out of the mold itself. The size of the orifices is very critical to develop the proper amount of flow into the mold to minimize the time for maximum heat transfer. For the part shown, the orifices 44 and 48 are approximately 0.005 inches. This dimension also allows a more uniform flow of condensable vapor through the manifold and into the mold cavity.

The larger slit orifice 64 at the bottom of the mold was 0.010 inches and allows the droplets of moisture or the condensate to easily pass out of the cavity and into the outlet manifold. If the orifices are very much larger than noted, the foam material, as it is injected into the cavity will tend to ooze past the orifices. Because they are controlled to a specific size, the material will not extrude through the orifices due to the internal gas pressure of the plasticized resin.

In summary, my invention allows a unique method for pre-heating the mold cavity above the deformation temperature of the foamable plasticized resin so when the resin is injected into the mold the part which would be produced would have a glossy or class A finish with a cellular inner structure. The invention further utilizes a unique valve means for both sealing the sprue opening of the mold during the heating step and then acting as a sprue gate during the injection step of the molding process. It should be further noted that the uniformity of temperature across a mold cavity is much better controlled because of the orificing means to both inject the condensable vapor into the mold cavity and the means for removing the condensate from the mold cavity.

While certain embodiments and details have been illustrated to show the invention, it will be apparent to those skilled in the art that changes and modifications could be made to this disclosure without departing from the spirit or scope of the invention described in the appended claims.

I claim:

1. A process for injection foam molding a thermoplastic plastic resin composition in an injection molding means comprising the steps of:
   (a) closing said mold means;
   (b) selectively closing a valve means to seal passage means interposed between sprue means and the mold cavity means;
   (c) selectively flowing a condensable vapor heated above the heat distortion temperature of said resin into said cavity means along peripheral portions thereof, said valve means closing off the sprue means from the condensable vapor;
   (d) selectively opening an outlet means from said cavity to vent condensate from said cavity means along other peripheral portions thereof;
   (e) opening said sealing valve means and injecting foamable thermoplastic resin into said sprue means and said resin flowing through said passage means to said cavity;
   (f) cooling said mold means by flowing chilled fluid through said mold means;
   (g) opening said mold upon solidification of said resin and removing solidified part.

2. The process of claim 1 wherein said condensable vapor is super heated steam.

3. The process of claim 1 wherein the temperature of said cavity is within from 250° F. to 420° F.

4. The process of claim 2 wherein said cavity is a temperature within from 250° F. to 420° F. and at a pressure of from 50 to 300 psig.

5. An apparatus for molding a thermoplastic resin comprising an injection molding means having two mold halves and a cavity means therein, a sprue means in communication with said cavity means through a passage means interposed therebetween, a means selectively operated to seal the passage means between said sprue means and said cavity means and selectively close off the sprue means from the cavity means when condensable vapor is introduced, an inlet means selectively operated to allow condensable vapor into said cavity means and an outlet means selectively operated to allow condensate to be discharged from said cavity, and a seal means peripherally located between said mold halves.

6. The apparatus of claim 5 wherein said sealing means between said passage means is a valve means which simultaneously seals said sprue and said cavity in its closed position and when said valve is in the open position provides a sprue gate into said cavity.

7. The apparatus of claim 5 wherein said inlet means is an opening in the mold communicating with a sealable inlet manifold channel between the mold halves extending along peripheral portions of said cavity means, and from said channel an inlet orifice communicates peripherally with said cavity means.

8. The apparatus of claim 7 wherein said orifice is a slit type opening and is from 0.005 to 0.010 inches high and approximately 0.125 inches deep and extending around at least 25% of the periphery of said cavity.

9. The apparatus of claim 6 or 7 wherein said outlet means is an opening in the mold communicating with a sealable outlet manifold channel between the mold halves extending along other peripheral portions of said cavity means, and communicating with said channel is an outlet orifice into said cavity means.

10. The apparatus of claim 9 wherein said orifice is a slit type opening and is from 0.010 to 0.020 inches high and approximately 0.125 inches deep and extending around at least 65% of the periphery of said cavity.

* * * * *